US012498889B2

(12) United States Patent
Sogaard et al.

(10) Patent No.: US 12,498,889 B2
(45) Date of Patent: Dec. 16, 2025

(54) MULTI-CLOUD TIERING TRANSLATION TO ENTERPRISE TIERS

(71) Applicant: Dell Products L.P., Round Rock, TX (US)

(72) Inventors: Inga Sogaard, Derby, KS (US); Hana Schuster Smith, Boulder, CO (US); Ofir Ezrielev, Be'er Sheva (IL)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/644,942

(22) Filed: Apr. 24, 2024

(65) Prior Publication Data

US 2025/0335133 A1     Oct. 30, 2025

(51) Int. Cl.
*G06F 3/06* (2006.01)
*H04L 67/1097* (2022.01)

(52) U.S. Cl.
CPC .......... *G06F 3/0685* (2013.01); *G06F 3/0604* (2013.01); *G06F 3/0649* (2013.01); *H04L 67/1097* (2013.01)

(58) Field of Classification Search
CPC ..... G06F 3/0685; G06F 3/0604; G06F 3/0649
See application file for complete search history.

(56) References Cited

U.S. PATENT DOCUMENTS

2011/0022642 A1* 1/2011 deMilo ................ G06F 16/122
707/805
2011/0138051 A1* 6/2011 Dawson ................ G06F 9/5072
709/226
2013/0159637 A1* 6/2013 Forgette .................. G06F 3/067
711/E12.001

(Continued)

OTHER PUBLICATIONS

"Multi-cloud Management Market Size, Share & Trends Analysis Report By Solution (Cloud Automation, Managed Services), By Enterprise Size (SME, Large), By End-use (BFSI, Healthcare), And Segment Forecasts, 2023-2030" [https://www.grandviewresearch.com/industry-analysis/multi-cloud-management-market-report] retrieved Apr. 24, 2024, 9 pages.

*Primary Examiner* — Ryan Bertram
(74) *Attorney, Agent, or Firm* — Amin, Turocy & Watson, LLP

(57) ABSTRACT

The technology described herein is directed towards mapping the storage tiers of various multi-cloud vendors to an enterprise's storage tiers and the enterprise's associated storage tier datasets, based on enterprise storage tiering definition data. Once mapped, the storage tier datasets are populated based on the vendor's per-tier metadata that are associated with the enterprise's data stored on that vendor's storage tiers. Similar mapping is performed for each other vendor's storage tiers. Once the storage tier datasets are populated based on the corresponding metadata, the metadata's variable parameters (e.g., performance metrics) for the enterprise's stored data can be presented according to the enterprise's own defined tiers and labels for the parameters. The metadata information in the datasets can be viewed per vendor and per enterprise-defined tier dataset, such as for object storage monitoring, cost comparison among different vendors' tiers, and closest vendor-to-enterprise parity comparisons of like variables.

20 Claims, 11 Drawing Sheets

(56) References Cited

U.S. PATENT DOCUMENTS

| | | | | |
|---|---|---|---|---|
| 2015/0302440 | A1* | 10/2015 | Monden | G06Q 30/0206 |
| | | | | 705/7.35 |
| 2020/0410418 | A1* | 12/2020 | Martynov | G06F 16/122 |
| 2022/0200929 | A1* | 6/2022 | Giraldo | H04L 47/83 |
| 2022/0391097 | A1* | 12/2022 | Rath | G06F 11/1461 |
| 2022/0407931 | A1* | 12/2022 | Gunda | H04L 67/1097 |
| 2023/0396518 | A1* | 12/2023 | Strassner | H04L 41/5019 |
| 2024/0111732 | A1* | 4/2024 | Yadav | G06F 16/183 |
| 2024/0211358 | A1* | 6/2024 | Nakajima | G06Q 30/0283 |
| 2024/0305523 | A1* | 9/2024 | Sethi | H04L 41/0806 |
| 2024/0354201 | A1* | 10/2024 | Duggal | G06F 16/1748 |

* cited by examiner

MULTI-CLOUD TIERING TRANSLATION TO ENTERPRISE TIERS

BACKGROUND

Multi-cloud storage uses multiple public cloud services, most often from different cloud providers. In multi-cloud storage, enterprises/organizations/customers may utilize a combination of on-premises, private cloud, public cloud, and edge store for various purposes. This allows enterprises to select storage for their various needs, including, but not limited to selecting the best performance of each cloud provider, avoiding being limited to one vendor, cost efficiency, regularly updated storage technology, enhanced security, increased reliability and redundancy, regulatory compliance, and so on. For example, an enterprise may use select cloud vendor for storing its mission-critical data, another cloud vendor for storing its archived data, and yet another cloud provider for disaster recovery.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
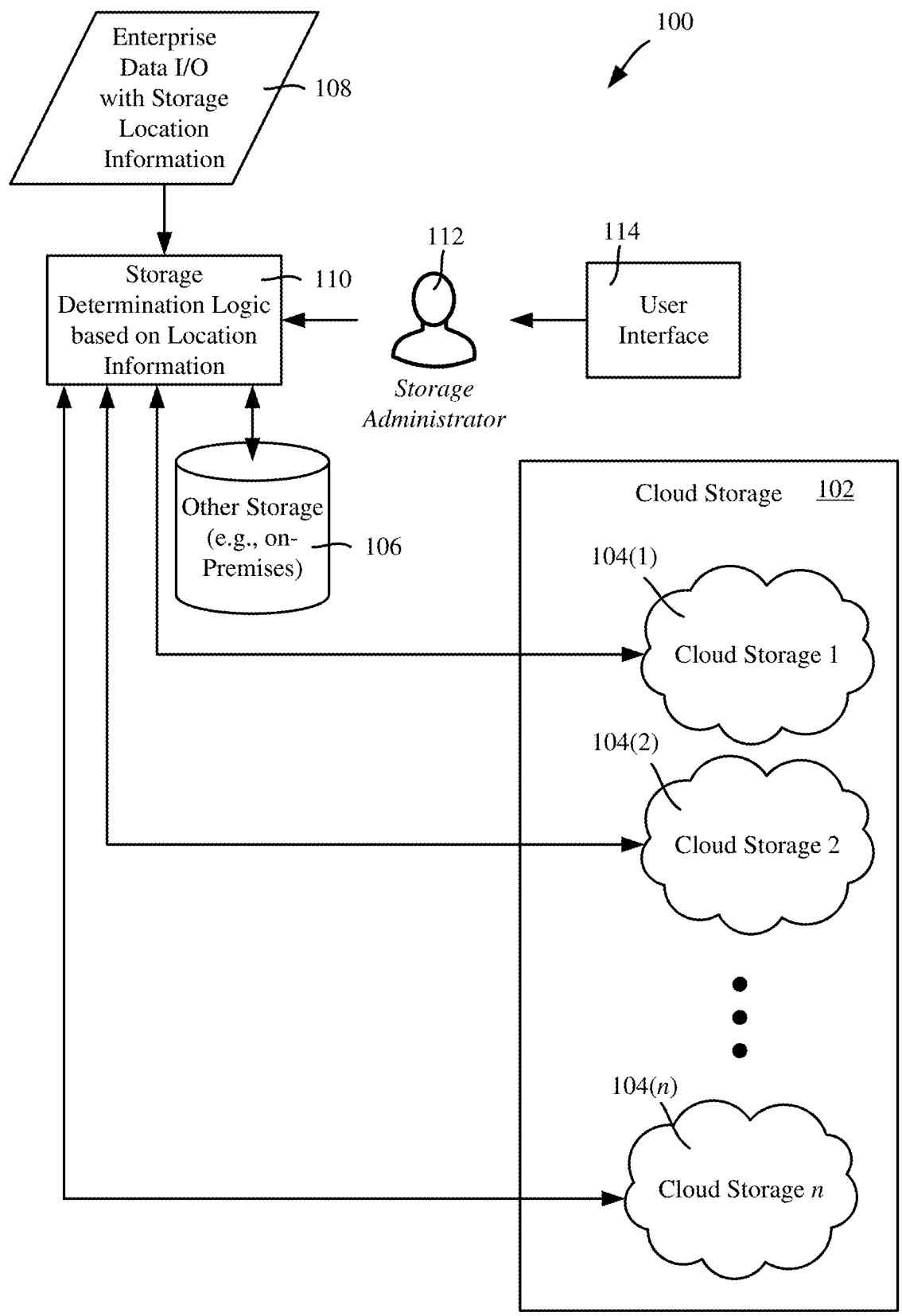
FIG. 1 is a block diagram showing an example system for storing and retrieving data in a multi-cloud data storage environment, in accordance with various embodiments and implementations of the subject disclosure.

The technology described herein is generally directed towards relating the storage tiers and associated storage tier datasets, as defined by an enterprise, to various storage tiers of various cloud provider storage vendors in a multi-cloud storage environment. Once the storage tier datasets are mapped to the storage tiers of a vendor, the storage tier datasets are populated based on per-tier, per-vendor metadata associated with the data stored by the enterprise among the cloud provider storage vendors.

The mapping and populating of storage tier datasets based on enterprise tiering definition data allows the enterprise stored data's variable parameters (e.g., performance metrics) to be evaluated according to the enterprise's own defined tiers and terminology, e.g., labels for the parameters. The datasets' information thus can be viewed per vendor, per enterprise-defined tier, such as for object storage monitoring, cost comparison among different vendors' tiers, closest vendor-to-enterprise parity comparison of variables, and so on.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. Similarly, "maximize" means moving towards a maximal state (e.g., up to some processing capacity limit), not necessarily achieving such a state, and so on.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1 is a generalized block diagram of an example system 100 including a multi-cloud environment 102 in which a number of cloud storage providers 104(1)-104(n), also known as vendors, offer different storage services with different storage-related resources to enterprises and the like. Many enterprise (e.g., customer) storage environments include multifaceted storage solutions, such as on premises storage 106 in combination with storage in the multi-cloud environment 102 that are supported by various storage vendors, including hybrid cloud storage (e.g., public and private cloud), as a service (aaS) cloud, and public cloud storage providers 104(1)-104(n).

In general, depending on the type of enterprise data, the enterprise defines a location (block 108) for that data, which can be a container, a bucket or similarly named logical grouping for the data. In general, storage determination logic 110 (which can be distributed among many enterprise determines) determines from the data's associated location (e.g., a bucket or container instance name) how to handle an input/output (I/O) request, such as to store one type of data in cloud storage 1 (104(1)), another type of data in cloud storage 2 (104(2)), another type of data in on-premises storage 106, and so on. The type information for a piece of data and thus its storage location can be defined in numerous ways by an enterprise, such as configured by a storage administrator 112. Example types of data include, but are not limited to, mission critical data, backup data, archive data, disaster recovery data, hot data, cold data, and so on.

For multi-cloud storage, the location of the data determines with which cloud provider a block of data or data object is stored, as well as which storage/service tier of that cloud provider to use for storing that data. A tier can be selected as such in various ways, such as by tier definition data defined by an enterprise. For example, an enterprise may identify hot data for writes and reads as "hot tier" type data, with various associated definitions with respect to a certain (low) latency of read access needed, a high percentage availability of access, a certain level of CPU, cache memory size and type, a certain minimum retention period, and so on. Disaster recovery type data can be maintained in a different tier, archive data in yet another tier, and so on.

In general, enterprises (organizations) set certain conditions on the recovery time objective (RTO) and recovery point objective (RPO) of their data, which depends on many different factors that are specific to a given business and type of industry. For some critical applications, the RTO has to be near zero, while it may be acceptable for other types of data to have a longer recovery period. For example, for non-critical applications, tier cost may be a driver for choosing a solution. As another example, for applications deemed by an enterprise as critical, the enterprise wants to maintain very close parity across vendors in terms of their tiering definitions.

However, a significant issue arises in that the various cloud storage providers 104(1)-104(n) typically have different definitions for their storage tiers from those of the enterprise, as well as with respect to one another. Not only are their tier definitions different, but vendors also can have different numbers of tiers (e.g., one vendor categorizes data into five discrete access tiers, whereas another only uses four). Further, the costs associated with each tier are different, and thus an enterprise often selects a vendor and tier that is least expensive depending on the type information of a block of data; e.g., archived data should be stored with a very low cost, as such data is seldom, if ever, accessed. Some vendors automatically move data between storage tiers to better optimize storage costs based on intelligent techniques, while conferring an additional charge for the automatic categorization of data. Thus, depending on the vendor, multiple kinds of tiers can exist within the same organization, as each vendor presents a slightly different way of tiering data, and the vendors' definitions may not be fully comparable.

As a result, enterprises use various workarounds to communicate the differences between vendor tiering to others (e.g., the stakeholders) within their organization. This is a very manual and deliberate process, which creates additional overhead and the possibility of errors in the operation of managing and monitoring a large object storage environment, which is already cumbersome.

Described herein is mapping how each vendor defines and categorizes data to what an enterprise defines with respect to its own categorization of data based on the enterprise's own needs. Additionally, the technology described herein provides better visibility into how much an enterprise is paying for each tier and service, e.g., to auto-tier the data, along with the correlation between RTO/RPO and the different storage tiers from a cost perspective; (there is currently little visibility into how much the enterprise is paying, as storage providers indicate that costs are based on the volume of data scanned). To this end, the technology described herein outputs information to the storage administrator 112 (or management) of an enterprise, such as through at least one user interface 114 that presents data of different cloud storage providers based on the enterprise's own storage tiering data definitions. This includes using the enterprise's own organizational tiering definitions and qualitative labels instead of each cloud storage provider's different labels and parameters.

Figure 2:
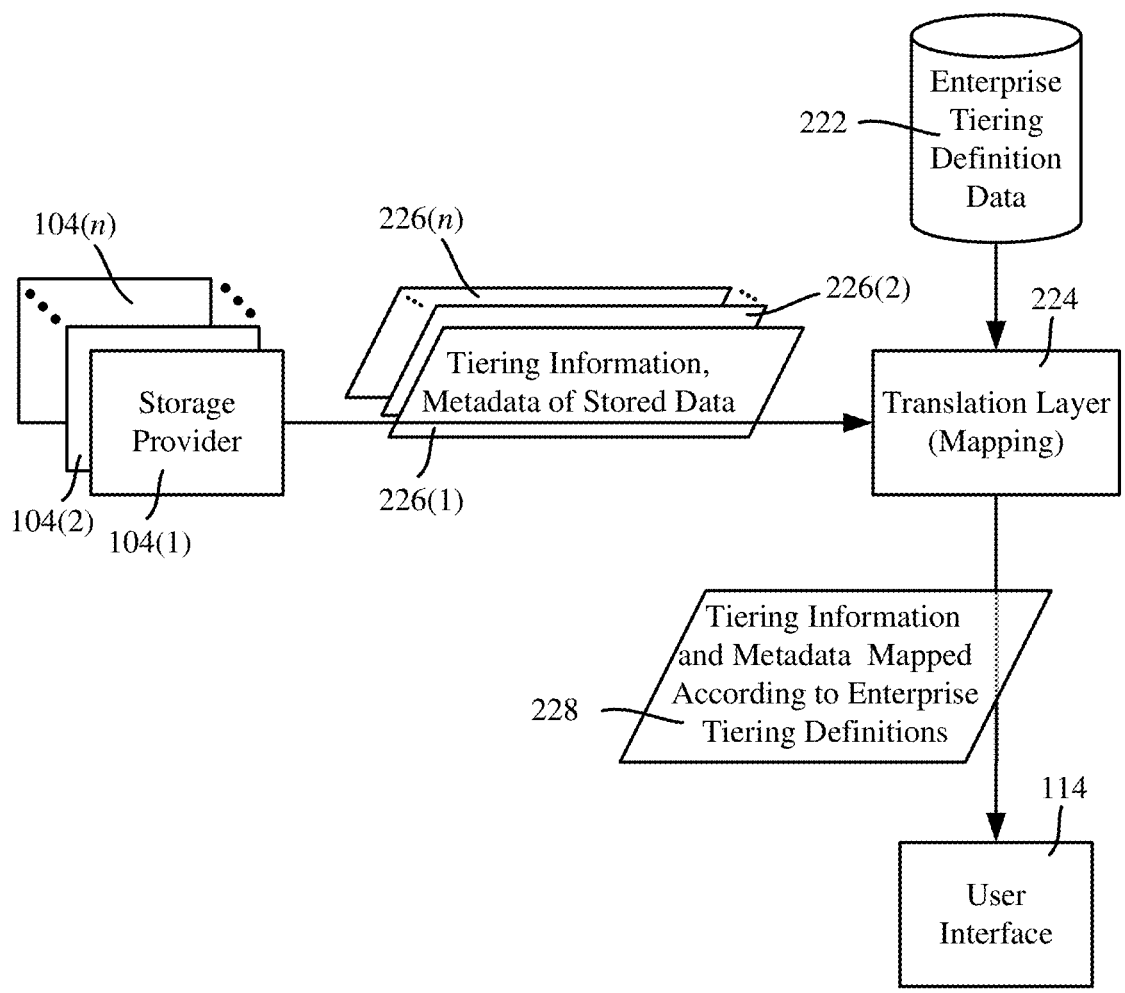
FIG. 2 is a block diagram showing an example architecture for mapping storage tiers of various vendors to enterprise tiers based on enterprise tiering definition data, and populating variables in the enterprise-defined tiers with metadata from the vendor storage tiers, in accordance with various embodiments and implementations of the subject disclosure.

FIG. 2 shows an example of an architecture that outputs relevant storage-related information to the user interface 114, in which the relevant storage-related information is based on the enterprise's tiering definition data 222, including tiering definitions, parameter data (e.g., performance metrics) using the terms of the enterprise, and other labels.

Figure 3:
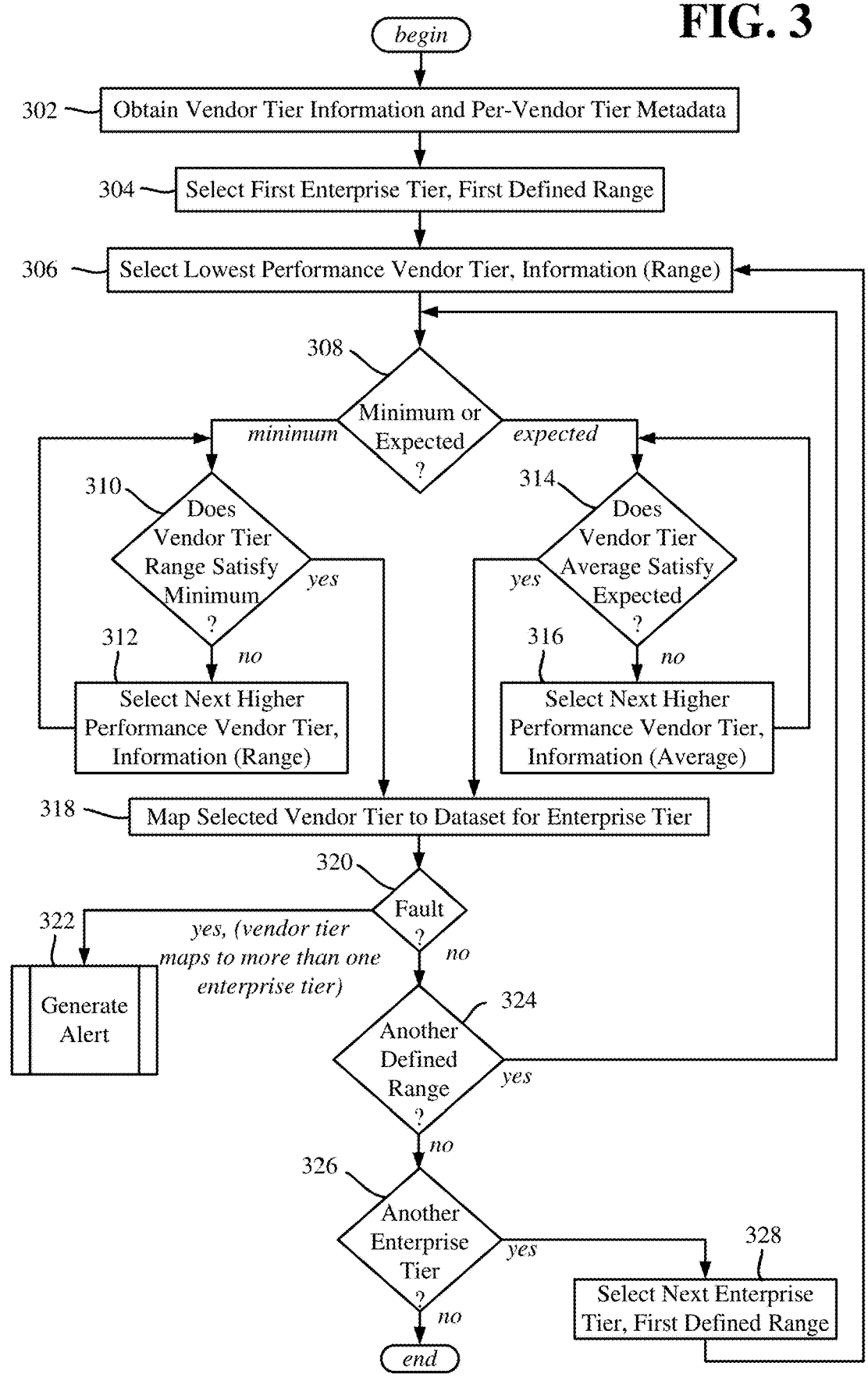
FIG. 3 is a flow diagram showing example operations for mapping vendor tiers to enterprise tiers, in accordance with various embodiments and implementations of the subject disclosure.

As described herein with reference to the example operations of FIG. 3, a translation layer 224 maps tiers of the respective storage providers 104(1)-104(n), provided as respective tiering information 226(1)-226(n), to the enterprise's tiers as defined in the enterprise's tiering definition data 222. In general, the tiering information of each of the different vendors can be defined to be directly mappable to enterprise tiering definitions; this can mean that the information of the vendor tier may not correspond to more than one tier of the enterprise. Notwithstanding, whether or not the information of the vendor tier may or may not correspond to more than one tier of the enterprise depends on how the enterprise defines tiers in different contexts, particularly when there are multiple parameters in consideration and/or different contexts. In one embodiment, such a fault can be detected by the translation layer, resulting in an alert or the like being generated.

In conjunction with obtaining the respective tiering information 226(1)-226(n), the translation layer 224 also may receive respective metadata associated with the enterprise's stored data, and populate the enterprise-defined tiers (datasets for the tiers, such as a dataset of the parameter values/performance metric data for each tier) according to the mapping described herein. The translated tiering information and metadata (block 228), mapped according to the enterprise's tiering definition data 222, can be formatted as appropriate for an enterprise's application needs, e.g., into widgets for presenting the data visually as human-readable content on a dashboard application, into a printed report, into a cost comparison presentation application, and so on.

To summarize, the translation layer 224 maps the respective providers' tiers to the enterprise tiers, and populates the enterprise-defined tiers based on respective metadata associated with the enterprise's stored data from the respective providers. The respective populated data for the enterprise tiers can be maintained in respective datasets, which can be formatted as appropriate and presented via the user interface 114.

By way of example, consider that a storage provider (e.g., 102(1)) provides information about the service level agreement (SLA) and/or service level objective (SLO) of each tier, whereas the enterprise tier is defined with a range of SLA/SLO values. As a more particular example, consider that the enterprise has a parameter with a desired performance metric value that ranges from 10 to 25, with a measured average of 20. The provider states that its performance metric for this parameter (which the provider may label differently) in storage tier X is between 15 and 25, with an average of 18. Depending on whether the enterprise wants its data to be handled according to the expected average (e.g., as specified in the SLA), or whether the enterprise wants its data to be handled according to a minimum (e.g., as specified in the SLO), the tier X may or may not suffice. Indeed, for the SLA, the tier X is not sufficient, as the provider average is 18, which is less than the expected average of 20; thus the data needs to be maintained in a different tier Y, or with a different storage provider that has a similar tier Z to tier X that meets the expected average, e.g., at a lower cost than the different tier Y of the storage provider's tier X being evaluated. In contrast, if the minimum value what the enterprise wants the storage provider to meet per the SLO, the tier X is adequate because the provider's minimum of 15 exceeds the enterprise's minimum of 10.

As can be seen, in the above example the translation layer maps the provider SLA/SLO to the SLA/SLO range provided by the enterprise. Similar examples may be based on recovery time objective (RTO) data values and recovery point objective (RPO) data values in the context of data protection/data recovery.

Figure 4:
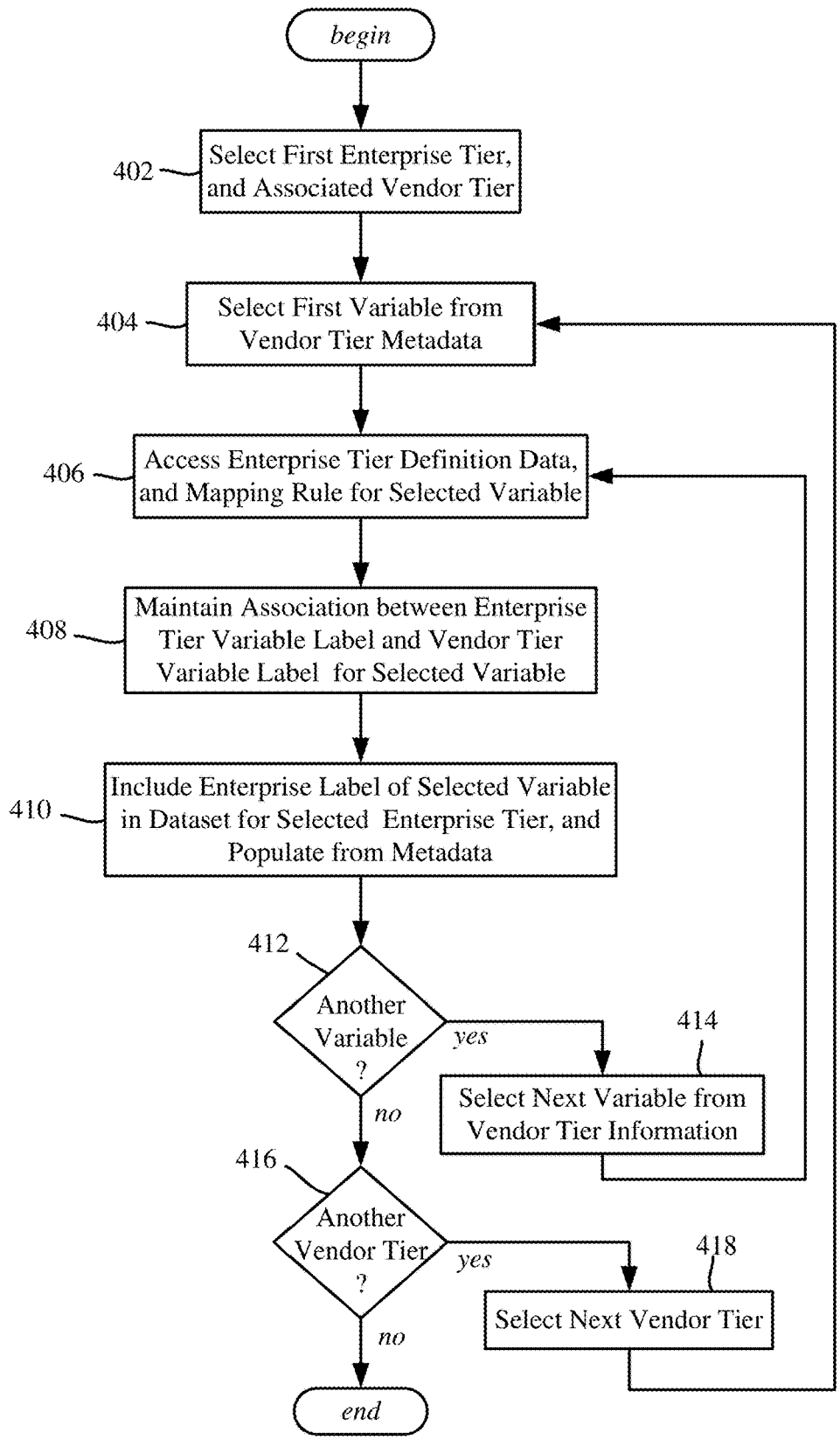
FIG. 4 is a flow diagram showing example operations for populating datasets of variables of enterprise tiers with metadata from vendor storage tiers, in accordance with various embodiments and implementations of the subject disclosure.

FIG. 3 shows example logic of a translation layer that maps service tiers of one storage provider (vendor) to the enterprise's tiers as defined in the enterprise's tiering definition data 222 (FIG. 2). FIG. 4 shows example logic for populating the enterprise datasets, using the enterprise's defined labels for parameters and the like, based on the metadata associated with the enterprise's defined tiers and the data stored therein. The operations of FIGS. 3 and 4 can be repeated for each vendor in the multi-tier environment. Note that the tiers, labels and/or resources identified by a vendor often change, and thus FIGS. 3 and 4 can be repeated as needed. Further, the example operations of FIG. 4 can be repeated, at least in part, as appropriate to refresh the output of parameter values, such as performance metrics, based on updated metadata. Further note that FIGS. 3 and 4 are nonlimiting examples of performing such mapping and populating of an enterprise's defined tiers and datasets of parameters per tier, and that other ways to do so can be employed in a straightforward manner.

In general, the example operations of FIG. 3 iterate over the various vendor tiers to map a vendor tier to one of the enterprise's defined tiers based on the range(s)/expected value(s) defined by the enterprise per tier. Examples of such variables can be CPU-related, RAM, non-volatile storage, price, speed, size.

Note that only variables that the enterprise is interested in having their conditions met by a vendor tier need to be evaluated; for example, if the vendor has an archive tier, the retrieval time is less important than the cost of storage per terabyte and the retention time identified for this vendor's tiers, and thus the enterprise can determine to not define a minimum retrieval rate for this archive tier and simply use the vendor's published retrieval rate data as appropriate.

Operation 302 of FIG. 3 represents obtaining the vendor tier information and vendor tier metadata (e.g., represented by block 226(1), FIG. 2) for a selected vendor. Operation 304 selects one of the enterprise's defined tiers as a first tier, and a first enterprise-defined range of values (e.g., for a performance metric or other parameter). Operation 306 selects the lowest performance vendor tier to see if that vendor tier satisfies the conditions (e.g., requirements) defined by the enterprise for its currently selected defined tier.

As described above, whether a condition is satisfied depends on whether a minimum value of an enterprise's defined range for a parameter is satisfied by the selected vendor tier, or whether the expected value of an enterprise's defined condition is met by the selected vendor's average for this parameter. If the minimum value is to be evaluated, operation 308 branches to operation 310 to evaluate the minimum of the enterprise's defined range versus the vendor's minimum for this parameter. Note that the enterprise tiering definition data may have to specify the vendor's label for the parameter and/or convert units if different from the enterprise's label and/or units, e.g., megabits per second converted to gigabytes per hour. Note further that instead of a minimum, a range's maximum can be considered, e.g., the enterprise can define a maximum cost or a cost range that is evaluated by operation 308 to see if the maximum is met by the currently selected vendor tier; the enterprise definition can specify whether the minimum or maximum needs to be satisfied, or possibly whether the entire range needs to fit within the vendor's range. For purposes of explanation, the evaluation of the minimum at operation 310 is described hereinafter.

If at operation 310 the vendor's range (e.g., lowest value therein, which may be the only value if the vendor has only a single value for this parameter) does not satisfy the enterprise's minimum defined condition, operation 310 branches to operation 312 to select a next higher performance tier of the vendor, along with the corresponding vendor's information for this parameter in the newly selected tier, and return to operation 310 to evaluate against the enterprises defined condition. Eventually a vendor tier will be found that satisfies the enterprise's condition data, and operation 318 will map the currently selected vendor tier to the enterprise's tier, including to a storage tier dataset for that tier to be populated with corresponding metadata; (if no tier is found this is an exception that is handled otherwise, e.g., flag the administrator that no tier of this vendor can meet the condition data, whereby the condition data is likely defined too strictly, or another vendor needs to be found with a tier that can meet the condition data).

Returning to operation 308 if the enterprise's defined expected value is to be evaluated against the vendor's (e.g., average) value, operation 308 instead branches to operation 314 to evaluate the enterprise's defined expected value versus the vendor's average (or the like) for this parameter. Again, some translation may need to be defined with respect to the vendor's label, and some conversion may be needed. If at operation 314 the vendor's average does not satisfy the enterprise's defined expected condition, operation 314 branches to operation 316 to select a next higher performance tier of the vendor, along with the corresponding vendor's information for this parameter in the newly selected tier, and return to operation 314 to evaluate against the enterprises defined condition data. Eventually (assuming no exception) a vendor tier will be found that satisfies the enterprise's condition data, and operation 318 will map the currently selected vendor tier to the enterprise's tier.

Any time that the selected vendor tier is mapped to the enterprise tier, there can be a fault if the enterprise tier maps to more than one different tier of the vendor being mapped; (if, as in this example, the enterprise is expecting a single enterprise tier-to-single vendor tier relationship). For example, consider that in enterprise tier 2 the defined minimum for enterprise parameter A is 80 which maps to vendor tier X, and in enterprise tier 2 the defined minimum for enterprise parameter B is 15 which maps to vendor tier Y, and thus enterprise tier 2 maps to both vendor tier X and vendor tier Y. If this occurs, operations 320 and 322 generate an alert and the mapping is halted for this vendor.

Assuming no fault exists, operation 324 repeats the process for each other defined range for a next variable within the enterprise's currently selected tier, which can be a single expected variable value, until none remain for the currently selected enterprise tier. Once no enterprise's variable's range or variable's value for the currently selected enterprise-defined tier remain to be mapped to a vendor tier, operations 326 and 328 return to operation 306 to repeat the process for the next enterprise-defined tier and so on, until none remain and all tiers of the selected vendor have been mapped to an enterprise-defined tier having an associated storage tier dataset based on the enterprise's defined requirements for this tier (or a fault was detected and an alert generated).

FIG. 4 shows an example of rule-based logic that maps the metadata for each variable (e.g., of a resource having a variable specified for it in the enterprise's tier) to a per-storage tier dataset that maintains the data for each variable in association with the enterprise label for that variable. In general, the vendor information for each service/storage tier includes various parameters of information/resources, such as instance type/size data for that service tier, cost data for that tier, virtual CPU data (e.g., number and type), memory data, storage capacity data, network bandwidth data and so on. Each vendor typically has its own naming convention, whereby the vendor's name for a given resource may not be the same as the enterprise's name for that same resource. Further, the labels and/or resources identified by a vendor often change.

Operation 402 selects the first enterprise tier, and its associated vendor tier (as mapped in FIG. 3). Operation 404 selects the first variable from the vendor's metadata for this enterprise/associated vendor tier.

Operation 406 represents accessing the enterprise tier definition data for this vendor variable, which may have an associated name translation rule and/or a conversion function. For example, if the first selected metadata refers to vendor CPU data labeled as type XYZ of Q gigahertz, the mapping rule may be to convert the type XYZ to "CPU" as labeled by the enterprise definition data. For speed data, a conversion may be to convert the S gigabytes per hour to T megabytes per minute, and so on as appropriate for the enterprise's usage of that data.

Operation 408 represents maintaining the association between the enterprise tier variable label (and any conversion function), e.g., for speed and efficiency each time the variable is refreshed with updated metadata. This association is already in the enterprise tier definition data, and thus operation 408 may not be needed if access to the enterprise tier definition data is sufficiently fast and efficient.

Operation 410 represents including the enterprise label for this variable in the dataset for the selected tier, and populating the dataset in association with the label based on the current value of the metadata. Once populated for a tier, the dataset can be accessed by any application (e.g., dashboard widget) or the like to read and output the dataset's information in some appropriate format.

Operations 412 and 414 repeat the populating of the dataset variables until none remain. Operations 416 and 418 repeat the populating of variables of the dataset for each other tier until each tier has its variables populated with information based on the vendor's per-tier metadata. The operations of FIG. 4 can be repeated as needed, resulting in a group of per-vendor datasets with labels for parameters corresponding to the enterprise's defined labels, and values for the parameters populated with the actual metadata for that enterprise tier and its mapped-to vendor tier.

It should be noted that the example operations of FIG. 4 are directed to populating each enterprise tier with corresponding metadata for each enterprise-defined variable. Some variables are dynamic, e.g., current CPU usage, current RAM usage, current IOPS rate, percentage storage capacity used, and so on. Thus, one or more of such variables can be repopulated as often as appropriate for a given scenario, e.g., when running an application that monitors only certain performance metrics in certain storage tiers across different vendors, and thus it is understood that this can be done without repopulating every variable value for every tier for every vendor.

In general, the vendor information for each service tier includes various parts of information, such as instance type/size data for that service tier, cost data for that tier, virtual CPU data (e.g., number and type), memory data, storage capacity data, network bandwidth data and so on.

Each vendor typically has its own naming convention, whereby the vendor's name for a given resource may not be the same as the enterprise's name for that same resource. Further, the labels and/or resources identified by a vendor often change.

The populated enterprise tiering information datasets can be sent to the user interface 114 (FIGS. 1 and 2), which presents the data accordingly, e.g., as formatted for display of relevant information. The displayed data may be refreshed as needed, e.g., periodically for monitoring purposes. In addition, clicking on a certain tier may enable viewing the provider tiers' data's metadata that was used to populate that enterprise tier. It is possible in this way, for example, to compare the costs of each provider for a certain enterprise tier.

Figure 5:
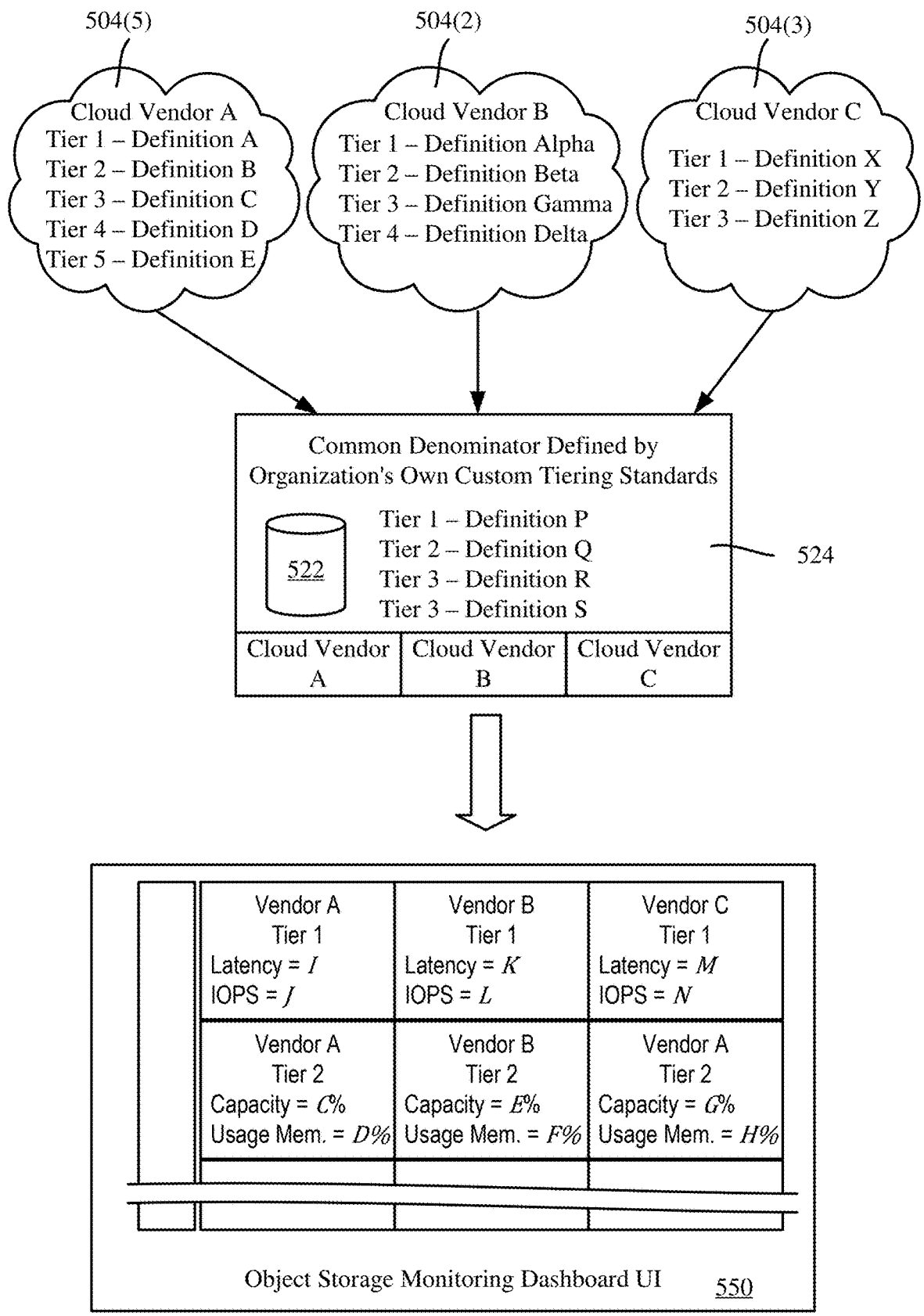
FIG. 5 is a representation of an example data storage monitoring user interface presentation based on mapping storage tiers of various vendors to enterprise tiers and populating variables in the enterprise-defined tiers with metadata, in accordance with various embodiments and implementations of the subject disclosure.

FIG. 5 shows an example of an application or group of applications (e.g., dashboard widgets) displaying vendor metrics within a management UI, such as on a storage monitoring dashboard 550. As described herein, in this example three respective cloud vendors 504(1)-504(3) have different definitions for their respective tiers, and they have different numbers of tiers relative to one another.

As described with reference to FIGS. 2-4, the common denominator among the different vendor tiers and naming conventions is the definitions of the enterprise (organization), as represented by data store 522 and translation/mapping layer 524 (corresponding to blocks 222 and 224 of FIG. 2). Thus, although the different cloud vendors 504(1)-504(3) have a different number of tiers, with different labels and parameters, these discrepancies are brought in line with the enterprise's own organizational tiering definitions and qualitative labels. The vendor metrics can then be displayed in a more meaningful way within the management UI, e.g., the storage monitoring dashboard 550.

Figure 6:
FIG. 6 is a representation of an example user interface presentation comparing vendor tiering with respect to matching enterprise variables with vendor metadata and cost data, in accordance with various embodiments and implementations of the subject disclosure.

FIG. 6 shows another example application, showing how the enterprise tiering information can be utilized within a management user interface 660. In this example, visual indicators illustrate which of the desired parameters within each tier have the closest parity to the enterprise's own tiering definitions, along with a direct cost comparison between vendors in line with those definitions.

Figure 7:
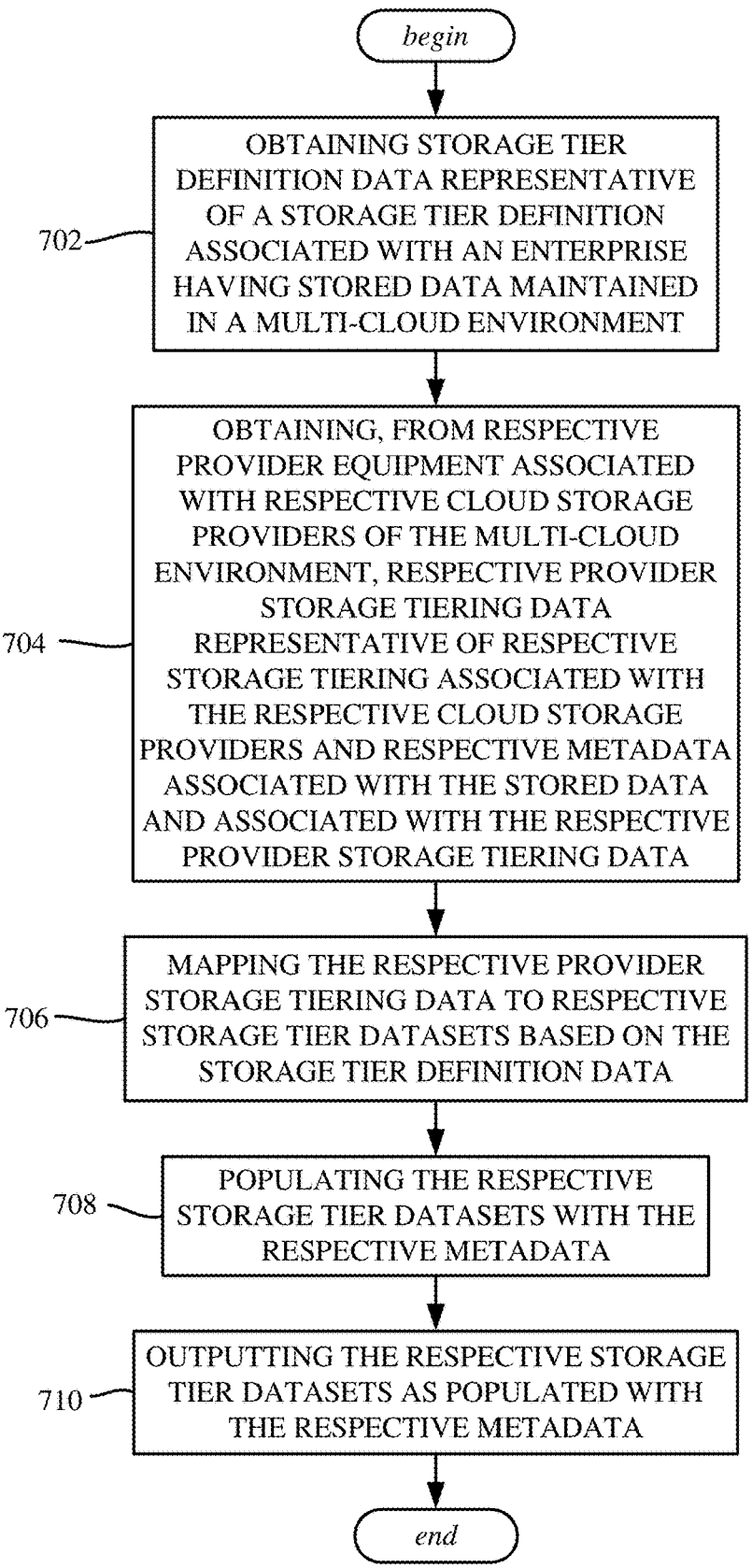
FIG. 7 is a flow diagram showing example operations related to mapping respective provider storage tiering data to respective (e.g., enterprise-defined) storage tiering datasets based on storage tier definition data, in accordance with various embodiments and implementations of the subject disclosure.

One or more concepts described herein can be embodied in a system, such as represented in the example operations of FIG. 7, and for example can include a memory that stores computer executable components and/or operations, and at least one processor that executes computer executable components and/or operations stored in the memory. Example operations can include operation 702, which represents obtaining storage tier definition data representative of a storage tier definition associated with an enterprise having stored data maintained in a multi-cloud environment. This can include an enterprise having data intending to be or planning to possibly be maintained in a multi-cloud environment. Example operation 704 represents obtaining, from respective provider equipment associated with respective cloud storage providers of the multi-cloud environment, respective provider storage tiering data representative of respective storage tiering associated with the respective cloud storage providers and respective metadata associated with the stored data and associated with the respective provider storage tiering data. Example operation 706 represents mapping the respective provider storage tiering data to respective storage tier datasets based on the storage tier definition data. Example operation 708 represents populating the respective storage tier datasets with the respective metadata. Example operation 710 represents outputting the respective storage tier datasets as populated with the respective metadata.

The storage tier definition data can include at least one of: recovery time objective data representative of a recovery time objective value, or recovery point objective data representative of a recovery point objective value.

The storage tier definition data can include at least one of: service level agreement data representative of at least part of a service level agreement, or service level objective data representative of a service level objective.

The storage tier definition data can include a range of values for a performance metric corresponding to a service level objective, and mapping the respective provider storage tiering data to the respective storage tier datasets can include determining, based on the respective provider storage tiering data, respective tiers of the respective cloud storage providers that satisfy a lowest value of the range of values.

The storage tier definition data can include a range of values for a performance metric corresponding to a service level agreement, and mapping the respective provider storage tiering data to the respective storage tier datasets can include determining, based on the respective provider storage tiering data, respective tiers of the respective cloud storage providers that satisfy an average value of the range of values.

The respective provider storage tiering data can include respective cost data representative of respective costs for respective storage tiers, and wherein the respective storage tier datasets can include the respective cost data associated with the respective cloud storage providers.

The respective metadata can include respective performance metric data representative of respective performance metrics associated with the respective cloud storage providers.

The respective performance metric data can include at least one of: respective throughput data representative of respective throughputs associated with the respective cloud storage providers, respective input-output operations per second data representative of respective input-output operations per second associated with the respective cloud storage providers, respective latency data representative of respective latencies associated with the respective cloud storage providers, respective service availability data representative of respective service availabilities associated with the respective cloud storage providers, respective error data representative of respective errors associated with the respective cloud storage providers, respective storage capacity data representative of respective storage capacities associated with the respective cloud storage providers, respective processor-related data representative of respective processor usages associated with the respective cloud storage providers, respective co-processor-related data representative of respective co-processor usages associated with the respective cloud storage providers, respective memory-related data representative of respective memory usages associated with the respective cloud storage providers, or respective storage device-related data representative of or respective storage device usages associated with the respective cloud storage providers. Outputting the enterprise tier data can include outputting visible data, representative of at least some of the enterprise storage tier definition data and at least some of the respective performance metric data, via a user interface.

Outputting the enterprise tier data can include outputting visible data, representative of at least some of the enterprise storage tier definition data and at least some of the respective metadata, via a user interface.

Outputting the enterprise tier data can include outputting visible data, representative of at least some of the enterprise storage tier definition data and at least some respective cost data, via a user interface.

Mapping the respective provider storage tiering data to respective storage tier datasets further can include detecting whether a selected tier of the respective provider storage tiering data corresponds to more than one tier defined in the storage tier definition data, and, in response to the selected tier corresponding to more than one tier defined in the storage tier definition data, outputting an alert.

Figure 8:
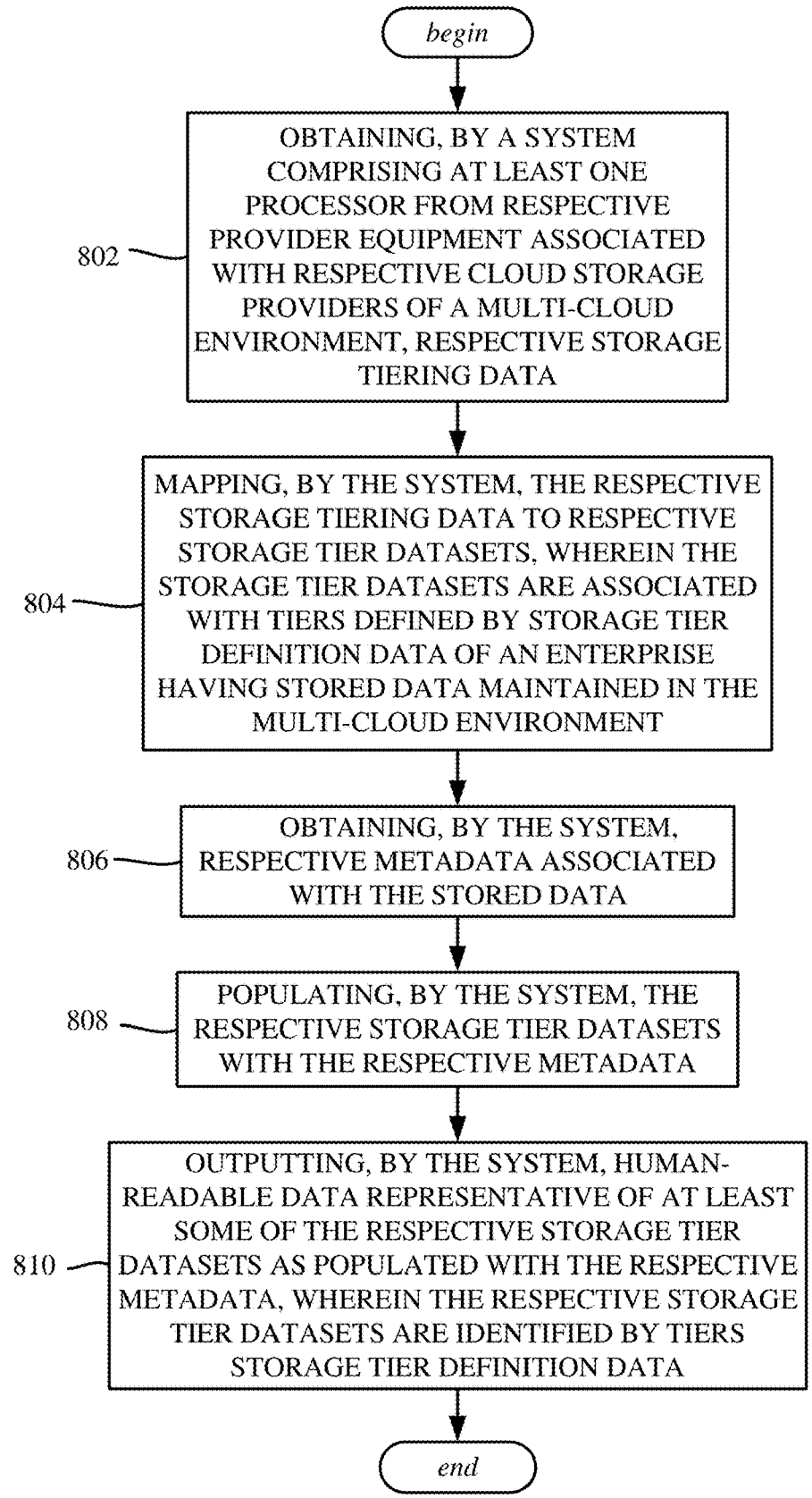
FIG. 8 is a flow diagram showing example operations related to outputting data based on mapping respective storage tiering data to respective storage tier datasets associated with tiers defined by storage tier definition data of an enterprise, in accordance with various embodiments and implementations of the subject disclosure.

One or more example embodiments, such as corresponding to example operations of a method, are represented in FIG. 8. Example operation 802 represents obtaining, by a system comprising at least one processor from respective provider equipment associated with respective cloud storage providers of a multi-cloud environment, respective storage tiering data. Example operation 804 represents mapping, by the system, the respective storage tiering data to respective storage tier datasets, wherein the storage tier datasets are associated with tiers defined by storage tier definition data of an enterprise having stored data maintained in the multi-cloud environment. Example operation 806 represents obtaining, by the system, respective metadata associated with the stored data. Example operation 808 represents populating, by the system, the respective storage tier datasets with the respective metadata. Example operation 810 represents outputting, by the system, human-readable data representative of at least some of the respective storage tier datasets as populated with the respective metadata, wherein the respective storage tier datasets are identified by tiers storage tier definition data.

Obtaining the respective metadata associated with the stored data can include obtaining respective performance data associated with the respective provider storage tiering data.

The storage tier definition data can include a range of values for a performance metric corresponding to a service level objective, and mapping the respective provider storage tiering data to the respective storage tier datasets can include determining, based on the respective performance data, respective tiers of the respective cloud storage providers that satisfy a lowest value of the range of values.

The storage tier definition data can include a range of values for a performance metric corresponding to a service level agreement, and mapping the respective provider storage tiering data to the respective storage tier datasets can include determining, based on the respective performance data, respective tiers of the respective cloud storage providers that satisfy an expected value of the range of values.

Outputting the human-readable data can include updating a visible display based on the at least some of the respective storage tier datasets as populated with the respective metadata.

Figure 9:
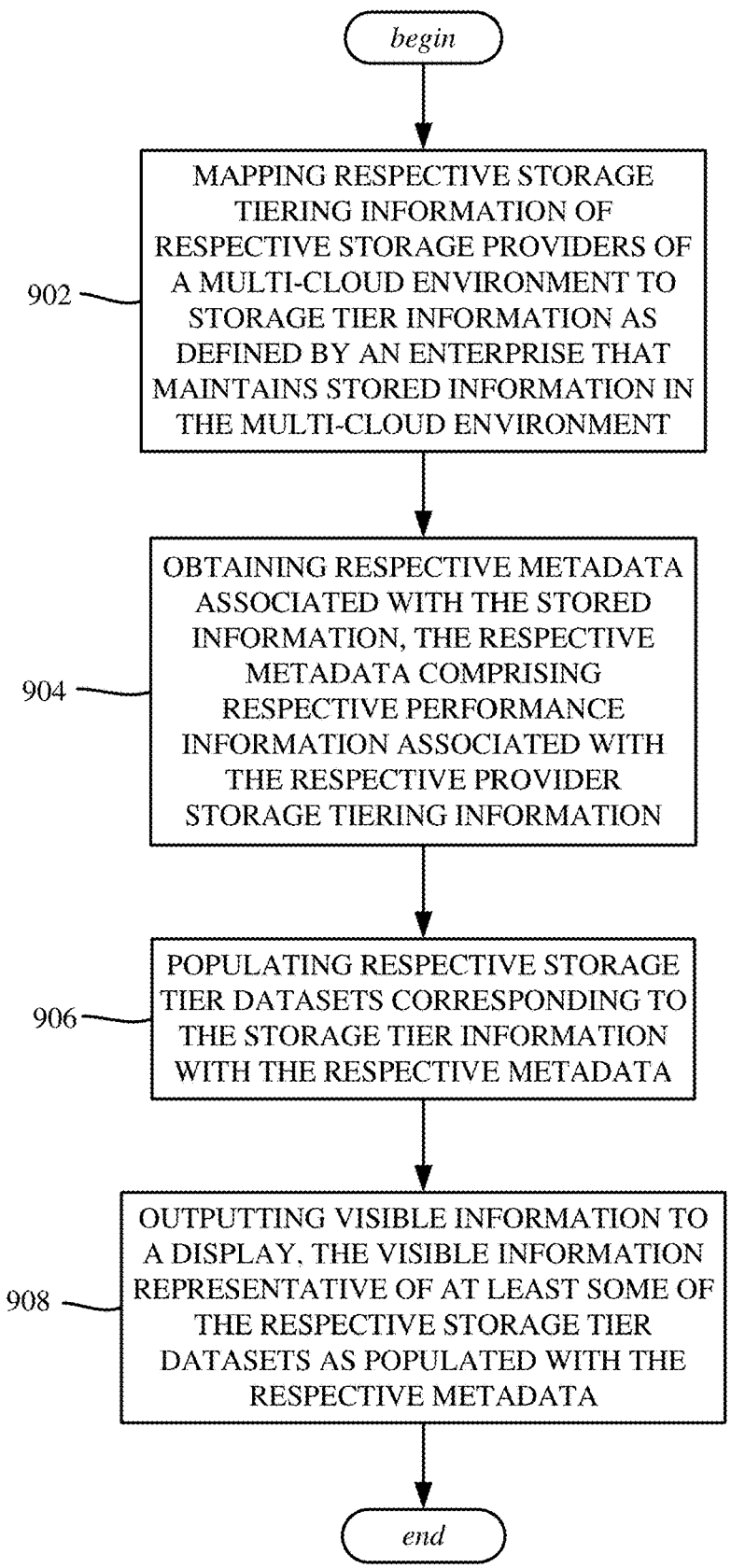
FIG. 9 is a flow diagram showing example operations related to outputting visible information based on obtaining performance information of metadata associated with provider storage tiering information, and mapping the storage tiering information to enterprise (e.g., customer) storage tiers having datasets populated with the performance information, in accordance with various embodiments and implementations of the subject disclosure.

FIG. 9 summarizes various example operations, e.g., corresponding to a machine-readable medium, comprising executable instructions that, when executed by at least one processor, facilitate performance of operations. Example operation 902 represents mapping respective storage tiering information of respective storage providers of a multi-cloud environment to storage tier information as defined by an enterprise that maintains stored information in the multi-cloud environment. Example operation 904 represents obtaining respective metadata associated with the stored information, the respective metadata comprising respective performance information associated with the respective provider storage tiering information. Example operation 906 represents populating respective storage tier datasets corresponding to the storage tier information with the respective metadata. Example operation 908 represents outputting visible information to a display, the visible information representative of at least some of the respective storage tier datasets as populated with the respective metadata.

The storage tier information can include a range of values for a performance metric, and mapping the respective storage tiering information can include determining, based on the respective performance information, respective tiers of the respective cloud storage providers that satisfy a lowest value of the range of values.

The storage tier information can include a range of values for a performance metric, and mapping the respective storage tiering information can include determining, based on the respective performance information, respective tiers of the respective cloud storage providers that satisfy an expected value of the range of values.

As can be seen, the technology described herein facilitates reducing the (e.g., cognitive) load and burden of a user managing a multi-cloud system by automatically presenting information in their enterprise/organization's storage tiering-language. A translation layer maps the providers' tiers to the enterprise tiers for various storage providers based on the enterprise's tiering definitions, populating storage tier datasets for those tiers based on the enterprise's stored data's metadata from the vendors according to the mapping and definitions/translations. In this way, enterprises can have advanced knowledge when data is moved into a different tier of storage, how long they will have to wait for the data to be recovered, the associated cost, and so on, as presented based on their own defined tiers and terminology.

The technology described herein thus improves the user experience with respect to multi-cloud management. In more generalized embodiments, this technology may be extended to other variables/other vendor comparisons, e.g., data center infrastructure management planning, such as space/power/performance/cost mapping of server offerings during for data center expansion.

Figure 10:
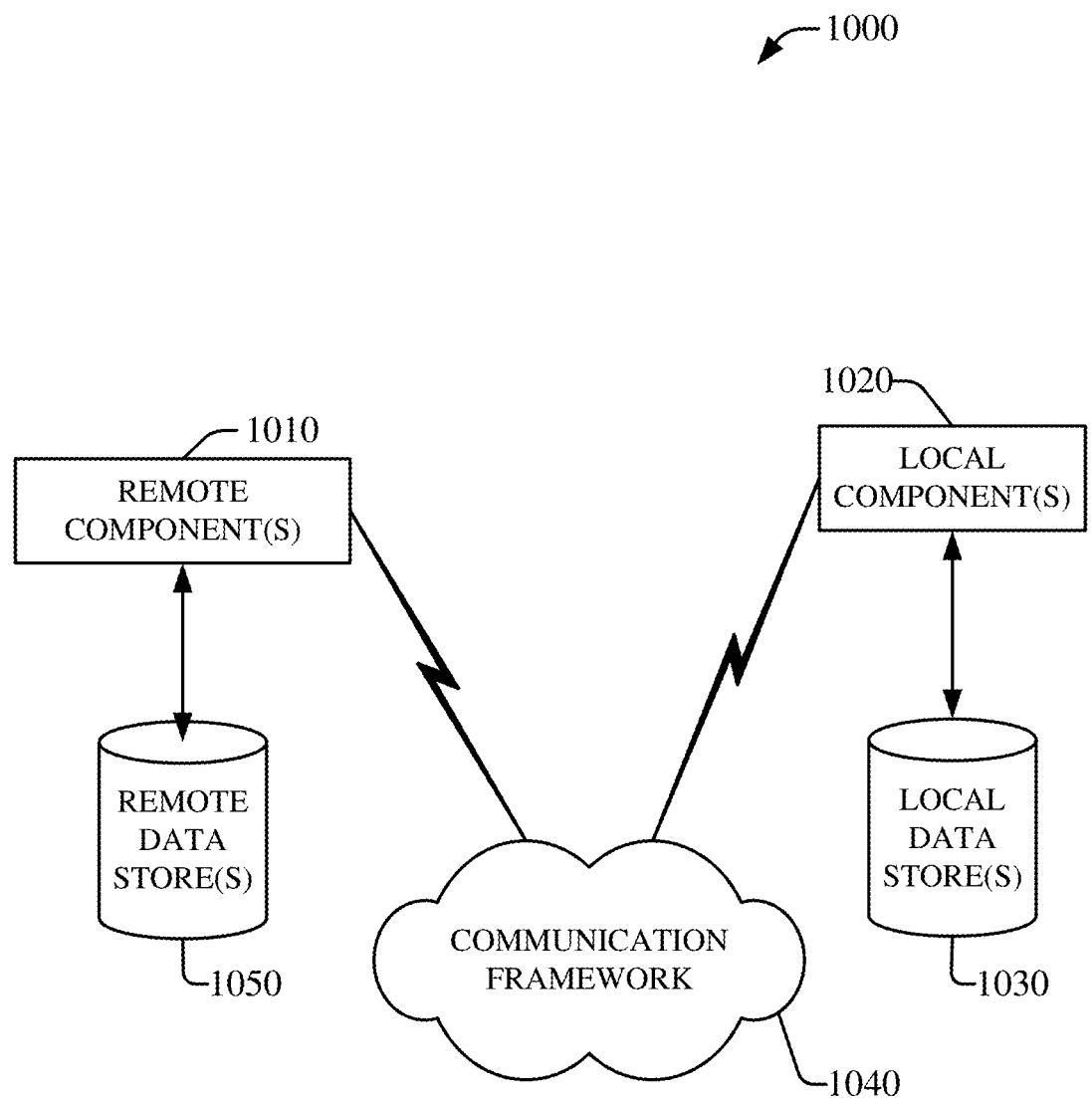
FIG. 10 is a block diagram representing an example computing environment into which embodiments of the subject matter described herein may be incorporated.

FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices). In some embodiments, local component(s) 1020 can comprise an automatic scaling component and/or programs that communicate/use the remote resources 1010, etc., connected to a remotely located distributed computing system via communication framework 1040.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
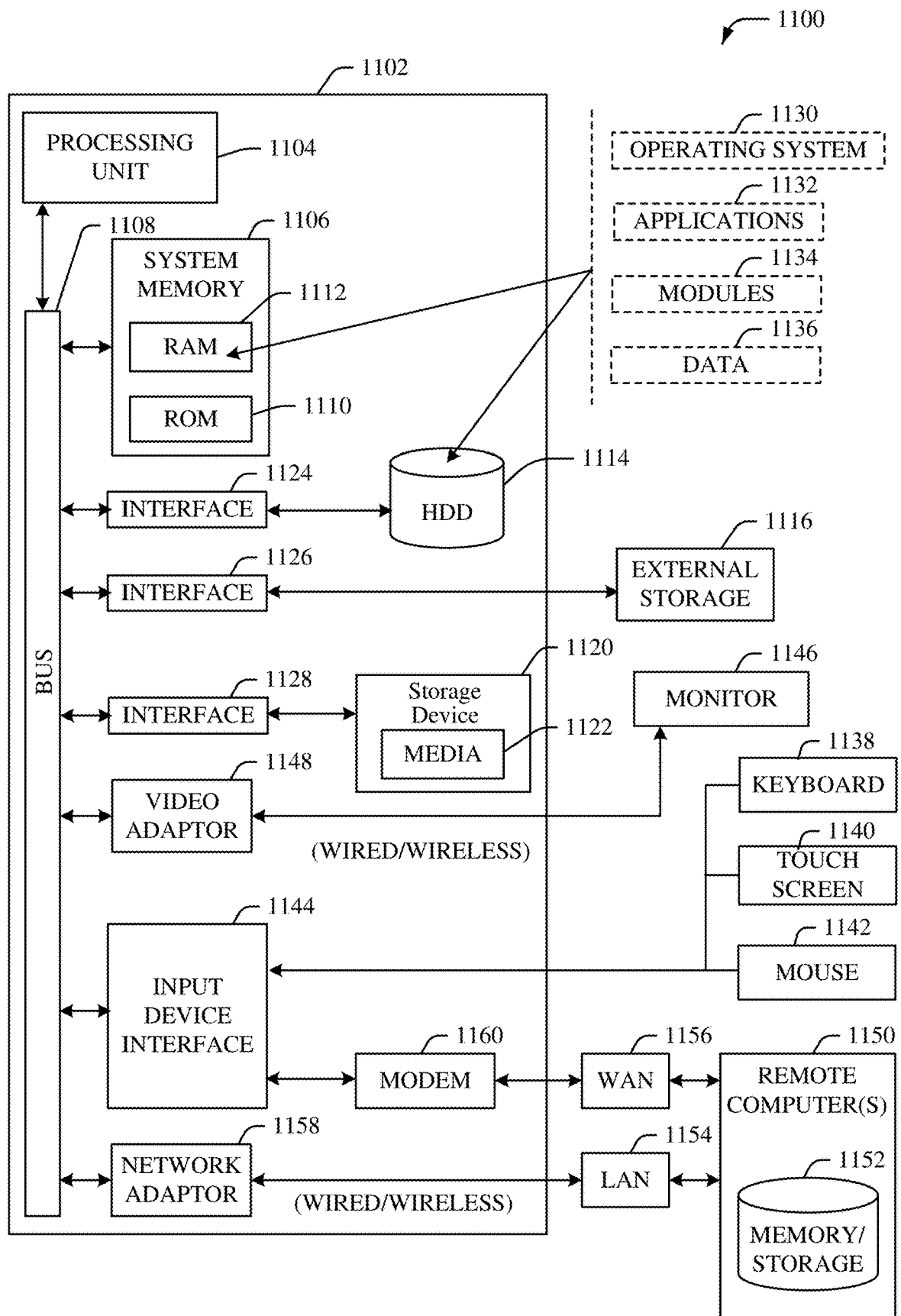
FIG. 11 depicts an example schematic block diagram of a computing environment with which the disclosed subject matter can interact/be implemented at least in part, in accordance with various embodiments and implementations of the subject disclosure.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), and can include one or more external storage devices 1116 (e.g., a magnetic floppy disk drive (FDD) 1116, a memory stick or flash drive reader, a memory card reader, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114.

Other internal or external storage can include at least one other storage device 1120 with storage media 1122 (e.g., a solid state storage device, a nonvolatile memory device, and/or an optical disk drive that can read or write from removable media such as a CD-ROM disc, a DVD, a BD, etc.). The external storage 1116 can be facilitated by a network virtual machine. The HDD 1114, external storage device(s) 1116 and storage device (e.g., drive) 1120 can be connected to the system bus 1108 by an HDD interface 1124, an external storage interface 1126 and a drive interface 1128, respectively.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (virtual machine) of multiple virtual machines hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1194 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
at least one processor; and
at least one memory that stores executable instructions that, when executed by the at least one processor, facilitate performance of operations, the operations comprising:
obtaining storage tiering definition data associated with an enterprise having stored data maintained in a multi-cloud environment, wherein the storage tiering definition data defines, for each tier of a first group of tiers of storage, respective first groups of parameters;
obtaining, from respective provider equipment associated with a group of cloud storage providers of the multi-cloud environment, respective provider storage tiering data associated with the group of cloud storage providers and respective metadata associated with the stored data and further associated with the respective provider storage tiering data, wherein provider storage tiering data of the respective provider storage tiering data for a cloud storage provider of the group of cloud storage providers defines, for each tier of a second group of tiers of storage, respective second groups of parameters;
for respective cloud storage providers of the group of cloud storage providers:
for respective tiers of the first group of tiers of storage:
for respective first parameters of the respective first groups of parameters:
identifying a second tier of the second group of tiers of storage of the cloud storage provider that corresponds to a first tier of the first group of tiers of storage based on a first parameter value of a first parameter of a first group of the respective first groups of parameters of the first tier and respective second parameter values of respective second parameters of the respective second groups of parameters of the tiers of the second group of tiers of storage of the cloud storage provider, and
generating mapping information of a mapping of the first tier of the first group of tiers of storage to the second tier of the second group of tiers of storage of the cloud storage provider;
populating the storage tiering definition data with the mapping information and the respective metadata associated with the respective provider storage tiering data; and
outputting the storage tiering definition data as populated with the mapping information and the respective metadata.

2. The system of claim 1, wherein the respective first group of parameters comprises at least one of: recovery time objective data representative of a recovery time objective value, or recovery point objective data representative of a recovery point objective value.

3. The system of claim 1, wherein the respective first group of parameters comprises at least one of: service level agreement data representative of at least part of a service level agreement, or service level objective data representative of a service level objective.

4. The system of claim 1, wherein the respective first group of parameters comprises a range of values for a performance metric corresponding to a service level objective, and wherein, for the respective cloud storage providers of the group of cloud storage providers, for the respective tiers of the first group of tiers of storage, for the respective first parameters of the respective first groups of parameters, the identifying of the second tier of the second group of tiers of storage of the cloud storage provider that corresponds to the first tier of the first group of tiers of storage comprises determining the second tier of the second group of tiers of storage of the cloud storage provider that has a second parameter value of a second parameter of the respective second groups of parameters of the tiers of the second group of tiers of storage of the cloud storage provider that satisfies a lowest value of the range of values.

5. The system of claim 1, wherein the respective first group of parameters comprises a range of values for a performance metric corresponding to a service level agreement, and wherein, for the respective cloud storage providers of the group of cloud storage providers, for the respective tiers of the first group of tiers of storage, for the respective first parameters of the respective first groups of parameters, the identifying of the second tier of the second group of tiers of storage of the cloud storage provider that corresponds to the first tier of the first group of tiers of storage comprises determining the second tier of the second group of tiers of storage of the cloud storage provider that has a second parameter value of a second parameter of the respective second groups of parameters of the tiers of the second group of tiers of storage of the cloud storage provider that satisfies an average value of the range of values.

6. The system of claim 1, wherein the respective provider storage tiering data comprises respective cost data representative of respective costs for respective storage tiers, and wherein the storage tiering definition data comprises the respective cost data associated with the respective cloud storage providers.

7. The system of claim 1, wherein the respective metadata comprises respective performance metric data representative of respective performance metrics associated with the respective cloud storage providers.

8. The system of claim 7, wherein the respective performance metric data comprises at least one of: respective throughput data representative of respective throughputs associated with the respective cloud storage providers, respective input-output operations per second data representative of respective input-output operations per second associated with the respective cloud storage providers, respective latency data representative of respective latencies associated with the respective cloud storage providers, respective service availability data representative of respective service availabilities associated with the respective cloud storage providers, respective error data representative of respective errors associated with the respective cloud storage providers, respective storage capacity data representative of respective storage capacities associated with the respective cloud storage providers, respective processor-related data representative of respective processor usages associated with the respective cloud storage providers, respective co-processor-related data representative of respective co-processor usages associated with the respective cloud storage providers, respective memory-related data representative of respective memory usages associated with the respective cloud storage providers, or respective storage device-related data representative of or respective storage device usages associated with the respective cloud storage providers.

9. The system of claim 8, wherein the outputting of the storage tiering definition data comprises outputting visible data, representative of at least some of the storage tiering definition data and at least some of the respective performance metric data, via a user interface.

10. The system of claim 1, wherein the outputting of the storage tiering definition data comprises outputting visible data, representative of at least some of the storage tiering definition data and at least some of the respective metadata, via a user interface.

11. The system of claim 1, wherein the outputting of the storage tiering definition data comprises outputting visible data, representative of at least some of the storage tiering definition data and at least some respective cost data, via a user interface.

12. The system of claim 1, wherein, for the respective cloud storage providers of the group of cloud storage providers, for the respective tiers of the first group of tiers of storage, for the respective first parameters of the respective first groups of parameters, the identifying of the second tier of the second group of tiers of storage of the cloud storage provider that corresponds to the first tier of the first group of tiers of storage comprises detecting that a selected tier of the second group of tiers of storage of the cloud storage provider corresponds to more than one tier of the first group of tiers of storage, and, in response to the selected tier corresponding to more than one tier of the first group of tiers of storage, outputting an alert.

13. A method, comprising:
obtaining, by a system comprising at least one processor, storage tiering definition data associated with an enterprise having stored data maintained in a multi-cloud environment, wherein the storage tiering definition data defines, for each tier of a first group of tiers of storage, respective first groups of parameters;
obtaining, by the system, from respective provider equipment associated with a group of cloud storage providers of the multi-cloud environment, respective provider storage tiering data associated with the group of cloud storage providers and respective metadata associated with the stored data and further associated with the respective provider storage tiering data, wherein provider storage tiering data of the respective provider storage tiering data for a cloud storage provider of the group of cloud storage providers defines, for each tier of a second group of tiers of storage, respective second groups of parameters;
for respective cloud storage providers of the group of cloud storage providers:
 for respective tiers of the first group of tiers of storage:
  for respective parameters of the respective first groups of parameters:
   identifying a second tier of the second group of tiers of storage of the cloud storage provider that corresponds to a first tier of the first group of tiers of storage based on a first parameter value of a first parameter of a first group of the respective first groups of parameters of the first tier and respective second parameter values of respective second parameters of the respective second groups of parameters of the tiers of the second group of tiers of storage of the cloud storage provider, and
   generating mapping information of a mapping of the first tier of the first group of tiers of storage to the second tier of the second group of tiers of storage of the cloud storage provider;
populating, by the system, the respective storage tiering definition data with the mapping information and the respective metadata associated with the respective provider storage tiering data; and
outputting, by the system, human-readable data representative of at least some of storage tiering definition data as populated with the mapping information and the respective metadata.

14. The method of claim 13, wherein the respective metadata comprises obtaining comprises respective performance data associated with the respective provider storage tiering data.

15. The method of claim 14, wherein the first group of parameters comprises a range of values for a performance metric corresponding to a service level objective, and wherein, for the respective cloud storage providers of the group of cloud storage providers, for the respective tiers of the first group of tiers of storage, for the respective first parameters of the respective first groups of parameters, the identifying of the second tier of the second group of tiers of storage of the cloud storage provider that corresponds to the first tier of the first group of tiers of storage comprises determining the second tier of the second group of tiers of storage of the cloud storage provider that has a second parameter value of a second parameter of the respective second groups of parameters of the tiers of the second group of tiers of storage of the cloud storage provider that satisfies a lowest value of the range of values.

16. The method of claim 14, wherein the first group of parameters comprises a range of values for a performance metric corresponding to a service level agreement, and wherein, for the respective cloud storage providers of the group of cloud storage providers, for the respective tiers of the first group of tiers of storage, for the respective first parameters of the respective first groups of parameters, the identifying of the second tier of the second group of tiers of storage of the cloud storage provider that corresponds to the first tier of the first group of tiers of storage comprises determining the second tier of the second group of tiers of storage of the cloud storage provider that has a second parameter value of a second parameter of the respective second groups of parameters of the tiers of the second group of tiers of storage of the cloud storage provider that satisfies an expected value of the range of values.

17. The method of claim 13, wherein the outputting of the human-readable data comprises updating a visible display based on the at least some of the storage tiering definition data as populated with the respective metadata.

18. A non-transitory machine-readable medium, comprising executable instructions that, when executed by at least one processor, facilitate performance of operations, the operations comprising:
obtaining storage tiering definition data associated with an enterprise having stored data maintained in a multi-cloud environment, wherein the storage tiering definition data defines, for each tier of a first group of tiers of storage, respective first groups of parameters;
obtaining, from respective provider equipment associated with a group of cloud storage providers of the multi-cloud environment, respective provider storage tiering data associated with the group of cloud storage providers and respective metadata associated with the stored data and further associated with the respective provider storage tiering data, wherein provider storage tiering data of the respective provider storage tiering data for a cloud storage provider of the group of cloud storage providers defines, for each tier of a second group of tiers of storage, respective second groups of parameters;
for respective cloud storage providers of the group of cloud storage providers:
 for respective tiers of the first group of tiers of storage:
  for respective parameters of the respective first groups of parameters:
   identifying a first tier of the second group of tiers of storage of the cloud storage provider that corresponds to a second tier of the first group of tiers of storage based on a first parameter value of a first parameter of a first group of the respective first group of parameters of the first tier and respective second parameter values of respective second parameters of the respective second groups of parameters of the tiers of the second group of tiers of storage of the cloud storage provider, and
   generating mapping information of a mapping of the first tier of the first group of tiers of storage to the second tier of the second group of tiers of storage of the cloud storage provider;

populating storage tiering definition data with the mapping information and the respective metadata associated with the respective provider storage tiering data; and outputting visible information to a display, the visible information representative of at least some of the storage tiering definition data as populated with the mapping information and the respective metadata.

19. The non-transitory machine-readable medium of claim 18, wherein the first group of parameters comprises a range of values for a performance metric, and wherein, for the respective cloud storage providers of the group of cloud storage providers, for the respective tiers of the first group of tiers of storage, for the respective first parameters of the respective first groups of parameters, the identifying of the second tier of the second group of tiers of storage of the cloud storage provider that corresponds to the first tier of the first group of tiers of storage comprises determining the second tier of the second group of tiers of storage of the cloud storage provider that has a second parameter value of a second parameter of the respective second groups of parameters of the tiers of the second group of tiers of storage of the cloud storage provider that satisfies a lowest value of the range of values.

20. The non-transitory machine-readable medium of claim 18, wherein the first group of parameters comprises a range of values for a performance metric, and wherein, for the respective cloud storage providers of the group of cloud storage providers, for the respective tiers of the first group of tiers of storage, for the respective first parameters of the respective first groups of parameters, the identifying of the second tier of the second group of tiers of storage of the cloud storage provider that corresponds to the first tier of the first group of tiers of storage comprises determining the second tier of the second group of tiers of storage of the cloud storage provider that has a second parameter value of a second parameter of the respective second groups of parameters of the tiers of the second group of tiers of storage of the cloud storage provider that satisfies an expected value of the range of values.

* * * * *